United States Patent
Wright et al.

(10) Patent No.: US 8,848,223 B2
(45) Date of Patent: Sep. 30, 2014

(54) PRINTING METHOD FOR MAINTAINING PROPER PAGE SEQUENCE WHILE REDUCING PRINTER ARTIFACTS

(75) Inventors: John Emmanuel Wright, Henrietta, NY (US); Alex David Horvath, Fairport, NY (US); Robert Fredric Mindler, Churchville, NY (US)

(73) Assignee: Kodak Alaris Inc., Rochester, NY (US)

( * ) Notice: Subject to any disclaimer, the term of this patent is extended or adjusted under 35 U.S.C. 154(b) by 291 days.

(21) Appl. No.: 13/300,251

(22) Filed: Nov. 18, 2011

(65) Prior Publication Data

US 2013/0128304 A1 May 23, 2013

(51) Int. Cl.
*G06F 3/12* (2006.01)
*G06K 1/00* (2006.01)
*B41J 11/00* (2006.01)
*B41J 15/04* (2006.01)
*B41J 3/60* (2006.01)

(52) U.S. Cl.
CPC ........... *B41J 3/60* (2013.01); *B41J 11/0095* (2013.01); *G06F 3/1251* (2013.01); *G06F 3/1208* (2013.01); *B41J 11/008* (2013.01); *B41J 15/04* (2013.01); *G06F 3/1285* (2013.01)

USPC ........... 358/1.15; 358/1.9; 358/498; 358/1.4; 358/1.5; 399/306

(58) Field of Classification Search
None
See application file for complete search history.

(56) References Cited

U.S. PATENT DOCUMENTS

| | | | | |
|---|---|---|---|---|
| 4,327,641 A * | 5/1982 | Goodwin et al. | ............. | 101/144 |
| 5,452,959 A | 9/1995 | Oka | | |
| 2005/0068356 A1 * | 3/2005 | Nambudiri | ............. | 347/14 |
| 2010/0060706 A1 | 3/2010 | Saga | | |
| 2011/0002721 A1 * | 1/2011 | Yamazaki | ............. | 399/364 |

FOREIGN PATENT DOCUMENTS

JP  2000 315275  11/2000

* cited by examiner

*Primary Examiner* — Thomas Lett
(74) *Attorney, Agent, or Firm* — Hogan Lovells US LLP

(57) ABSTRACT

A printing method for a print job having at least two pages. After determining a position of rolled media in the printer, print data for either a first page or a second page of the print job can be staged for printing first. This can be performed at a host computer connected to the printer or it can be performed in the printer.

20 Claims, 12 Drawing Sheets

PRINTING METHOD FOR MAINTAINING PROPER PAGE SEQUENCE WHILE REDUCING PRINTER ARTIFACTS

CROSS REFERENCE TO RELATED APPLICATIONS

U.S. patent applications Ser. No. 13/300,282, entitled "Method for Maintaining Proper Page Sequence While Reducing Printer Artifacts"; and Ser. No. 13/300,183, entitled "System for Maintaining Proper Page Sequence While Reducing Printer Artifacts"; and Ser. No. 13/300,313, entitled "Printing System for Maintaining Proper Page Sequence While Reducing Printer Artifacts", filed concurrently herewith are assigned to the same assignee hereof, Kodak Alaris Inc. of Rochester, N.Y., and contain subject matter related, in certain respect, to the subject matter of the present application. The above-identified patent applications are incorporated herein by reference in their entirety.

FIELD OF THE INVENTION

The present invention is directed to thermal printing, in particular, to controlling an amount of contact between thermal media and a feed roller in the printer.

BACKGROUND OF THE INVENTION

It is a well known practice within Dye Diffusion Thermal Transfer printers that, in order to controllably drive the paper and maintain image registration between color passes, an aggressively textured drive roller, and a companion pinch roller that applies a load between the paper and drive roller, is commonly used. This type of drive system does not result in any image artifacts on the printed paper when printing only on one side, or simplex printing, because the aggressively textured drive roller is not contacting the printed side of the paper. This method does present a problem when printing a two-sided, or duplex print because the aggressively textured drive roller must contact both sides of the printed sheet. For two-sided or duplex printing, the paper surface that is in contact with the aggressively textured surface of the drive roller may become compromised by the aggressively textured surface. This compromised paper surface may not receive dye transfer as readily, resulting in a visible density difference between the area of the paper that saw contact with the drive roller's aggressive texture and the area that did not contact the aggressive texture.

It is also common practice within the Dye Diffusion Thermal Transfer printer firmware to incorporate compensation algorithms that correct for across the page density variations, and/or down the page density variations. There may be limitations within the printer hardware or printer firmware such that compensation algorithms cannot completely compensate for printing artifacts generated by the drive roller. Due to these limitations, it becomes important to minimize the number of times that new contact occurs between the aggressively textured drive roller and the paper surface.

With respect to FIGS. 2-3, for two-sided or duplex Dye Diffusion Thermal Transfer printing, one common method is to use two thermal print heads 117, 137, as shown in FIG. 2, drive the rolled print paper 110 via drive roller (or feed roller) 113 and pinch roller 112 to between platen roller 123 and one thermal print head 117 (hereinafter TPH1), print on one side of the print paper 100, then re-position the paper by reversing feed roller 113 and, as shown in FIG. 3, drive the print paper via drive roller 113 and pinch roller 141 to between platen roller 131 and the second thermal print head 137 (hereinafter TPH2), and print on the non-printed surface 101 of the print paper. Sensors 124 and 130 detect paper position in the printer. After completion of printing on both surfaces 100, 101 of the print paper, the printed paper is ejected from the printer along paths 121 or 133, and is commonly collected via exit guide 125, after being cut by cutters 126 and output via rollers 127 into a paper catch tray 128.

With reference to FIG. 4, there is illustrated a length of paper driven through the drive roller 113 and pinch roller 141, exposing paper surface 100 to come into contact with the drive roller's aggressive surface texture, compromising the paper surface 100 for subsequent prints. In a non-preferred printing method which one might normally expect if given the above sequence of printing steps, the next two-sided print job would again be staged to print using thermal print head TPH1 on paper side 100 (see FIG. 7), and then re-position the paper, and drive the paper to the other thermal print head TPH2 and print on the non-printed side of the print paper 101, thus repeating the steps of FIGS. 2, 3 and 4. This printing sequence introduces an unnecessary repositioning of the paper between TPH2 137 and side 101 of the paper back over to TPH1 117 and side 100 of the paper, once again unnecessarily exposing the paper surfaces to come into contact with the drive roller's aggressive surface texture during the retraction, compromising the paper surfaces.

With regard to photobook printing, a known method to generate the sequential page content and sending the image data to the printer so that a photo book is printed with proper page order is illustrated in FIG. 8 wherein a host computer 10 communicates a host request to a connected printer 50 and receives a printer response. This is a common method of a host computer communicating with the connected printer, typically through USB connection, wired ethernet, or wireless connection. FIG. 9 shows a typical print job printing page sequence sent from the Host Computer to the Printer: Page 10 951, Page 9 950, Page 8 941, Page 7 940, Page 6 931, Page 5 930, Page 4 921, Page 3 920, Page 2 911, Page 1 910. The pages are sent to the printer in reverse sequential order so that the last printed page that is ejected in to the print catcher tray 128 is the first page of the photo book. An alternate typical Print Job Printing Sequence (reversed) would be: Page 1, Page 2, Page 3, Page 4, Page 5, Page 6, Page 7, Page 8, Page 9, Page 10. This page order would result in the photo book being face-down in the print catcher tray, but would still be in proper page order.

SUMMARY OF THE INVENTION

In regard to the example method described above with reference to FIGS. 2, 3, 4, a length of paper is driven through the drive roller 113 and pinch roller 141, exposing paper surface 100 to come into contact with the drive roller's aggressive surface texture, compromising the paper surface 100 for subsequent prints. In a preferred method of printing described in detail herein, the next two-sided print may be staged to print using TPH2 as a first step on paper side 101, as shown in FIG. 5. The same thermal print head and paper side is used as was printed last on the immediately previous print. After completion of printing on print paper side 101 in the preferred first step (hereinafter referred to as Side B), the printer will re-position the print paper as before, and drive the print paper to the other TPH1 and print on the non-printed side of the print paper 100 (hereinafter referred to as Side A), as shown in FIG. 6. To generalize this method, a preferred printing method is to start the next two-sided print on the same thermal print head and paper side as was printed last on the immediately previous print.

Since the method of printing just described requires one less print paper repositioning step, the amount of contact between the print paper and the feed roller's aggressive texture area is reduced, which results in a lower amount of print paper being compromised. Additionally, this approach maximizes through-put of the printer by eliminating one print paper repositioning step.

A preferred embodiment of the present invention comprises a printing method including generating print data for a first print job having at least two pages, determining a position of a rolled receiver media in a thermal printer, and sending the print data for either one of the two pages to a printer before sending the print data for the other of the two pages in response to the position of the receiver media in the thermal printer. Sending print data comprises sending the second page data of the print job before sending the first page data of the print job. Determining media position comprises determining at which printhead in the printer the media is positioned. A simplex print job is printed using only one of the printheads, whichever one printed a last page of an immediately previous print job. In a duplex print job, one of the printheads is used only for printing even numbered page sand the other for printing odd numbered pages. In any case, the printer outputs the pages in an ordered sequence according to the page numbers.

Another preferred embodiment of the present invention comprises a printing method for receiving and storing print job data with at least two pages at a printer. The printer determines a position of a rolled receiver media in the printer and prints the print data for either one of the two pages before printing the print data for the other of the two pages, in response to the position of the media in the printer. The printer prints the second page of the print job before printing the first page of the print job. The receiver media can be positioned at either one of two printheads in the printer. For a simplex print job the printer uses one of the printheads at which the media is positioned for the entire job. For a duplex print job comprising a plurality of even and odd numbered pages the printer prints pairs of the even numbered pages consecutively pairs of the odd numbered pages consecutively.

Another preferred embodiment of the present invention comprises storing a print job comprising a plurality of pages. The printer then determines a position of a rolled receiver media and starts a next print job in a duplex format using either one of the two printheads depending on which is nearer the rolled receiver media. A second page of the print job can be printed first using a printhead that was determined to be nearer the media before printing a first page of the duplex print job. The print job can be stored in the printer or in a host computer connected to the printer, each of which is capable of selectively sequencing the print data into printed pages.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

Preferred embodiments of the present invention will be more readily understood from the detailed description of exemplary embodiments presented below considered in conjunction with the attached drawings, of which.

DETAILED DESCRIPTION OF THE INVENTION

Figure 1:
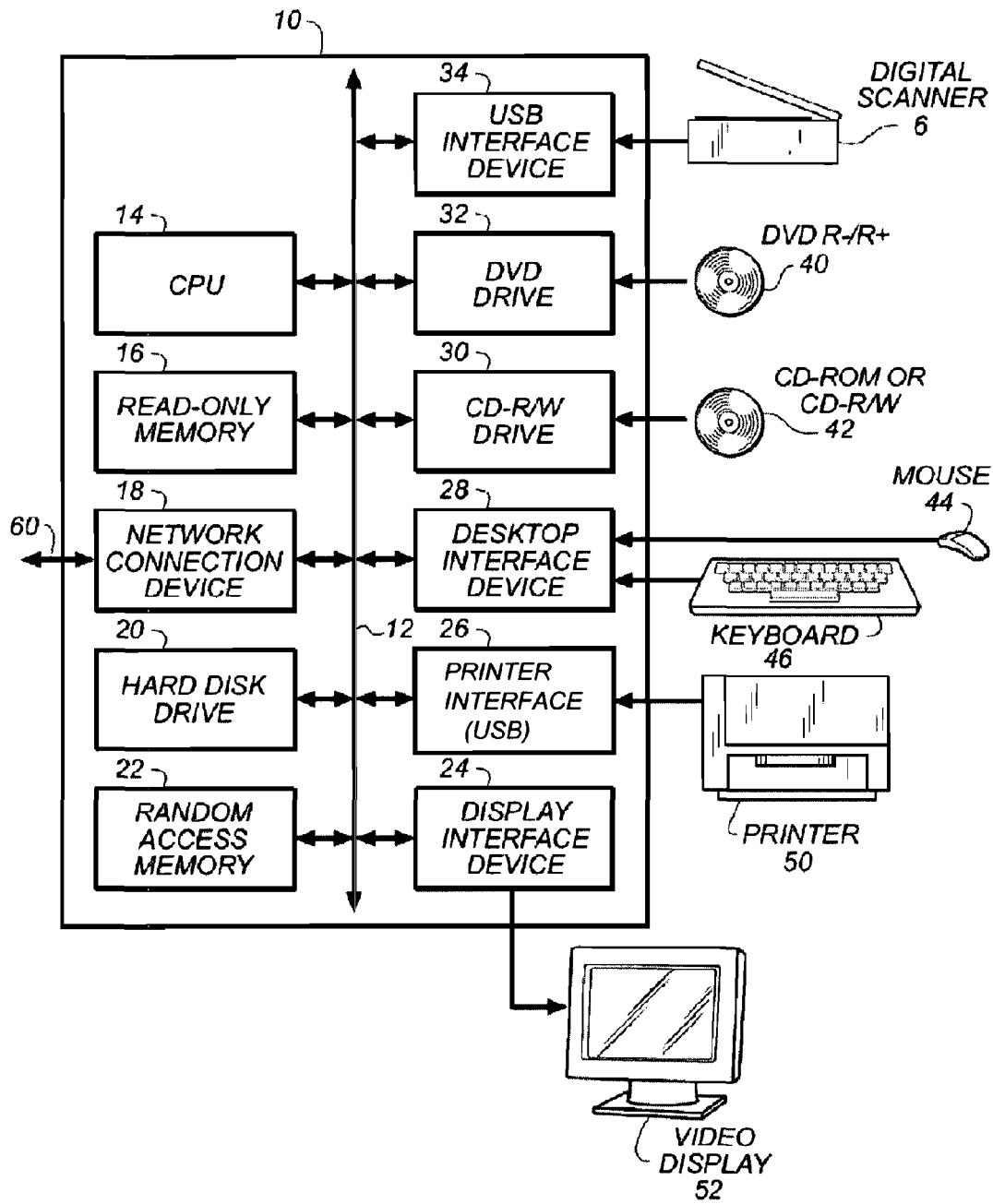
FIG. 1 illustrates a computer operated thermal printing system.
Figure 2:
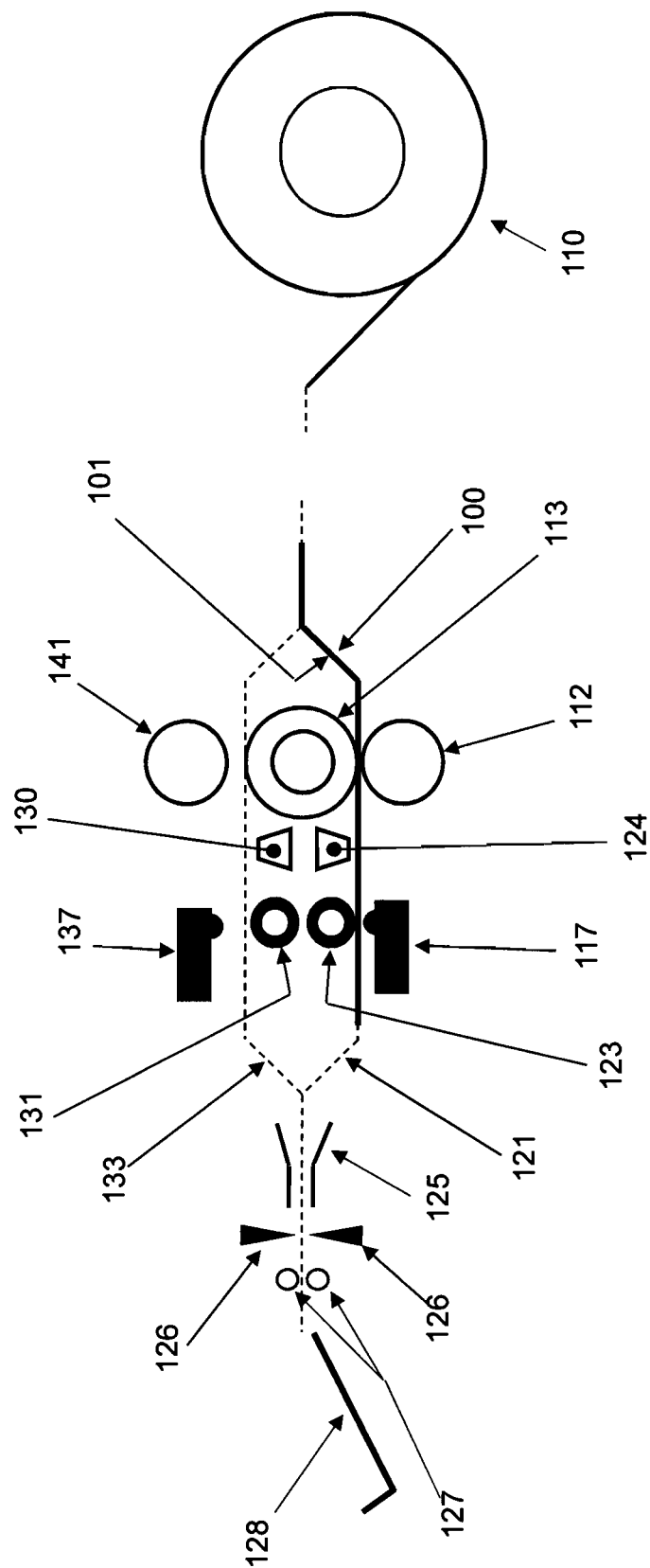
FIG. 2 illustrates a document positioned in a thermal printer apparatus.
Figure 3:
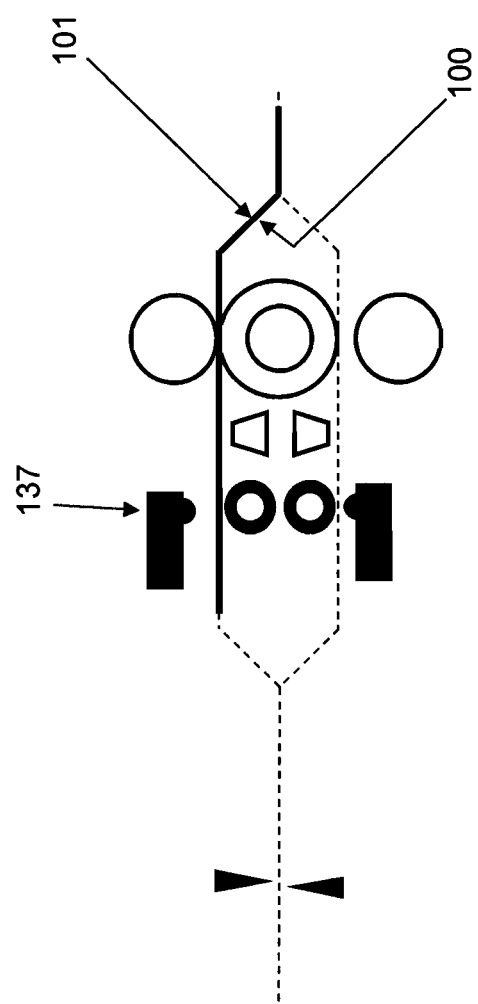
FIG. 3 illustrates a document positioned in a thermal printer apparatus.
Figure 4:
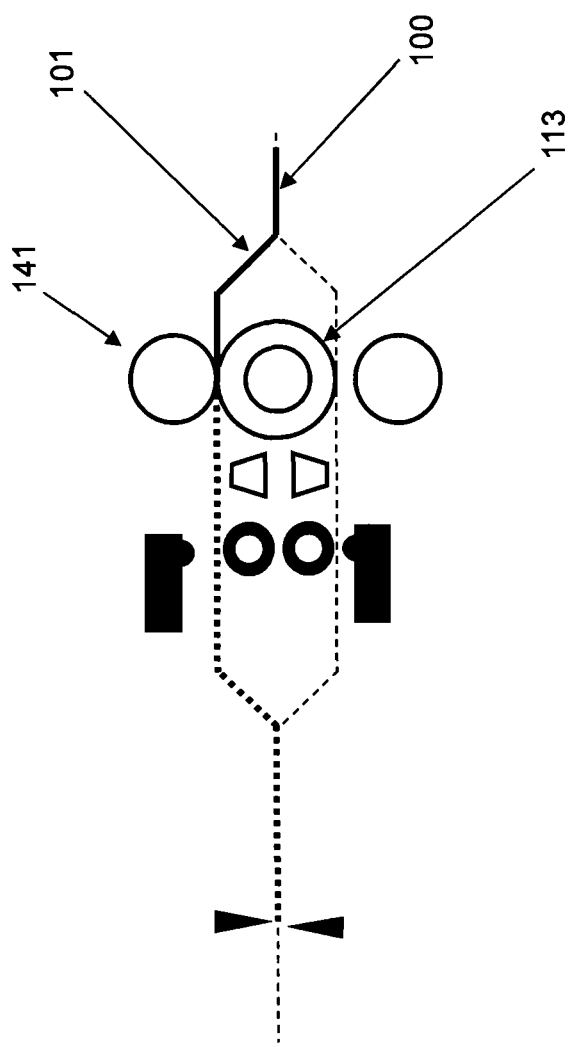
FIG. 4 illustrates a document positioned in a thermal printer apparatus.
Figure 5:
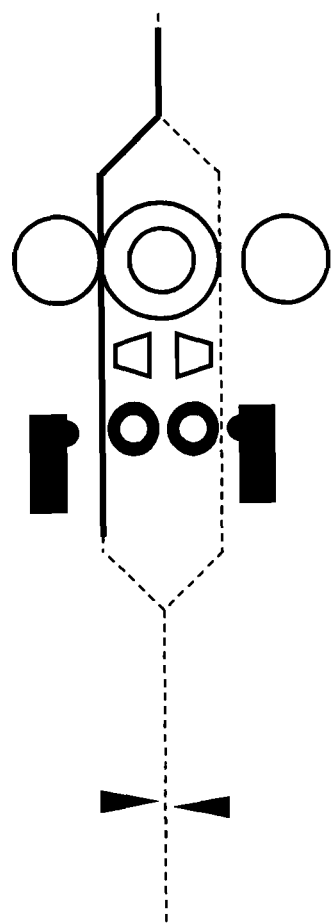
FIG. 5 illustrates a document positioned in a thermal printer apparatus.
Figure 6:
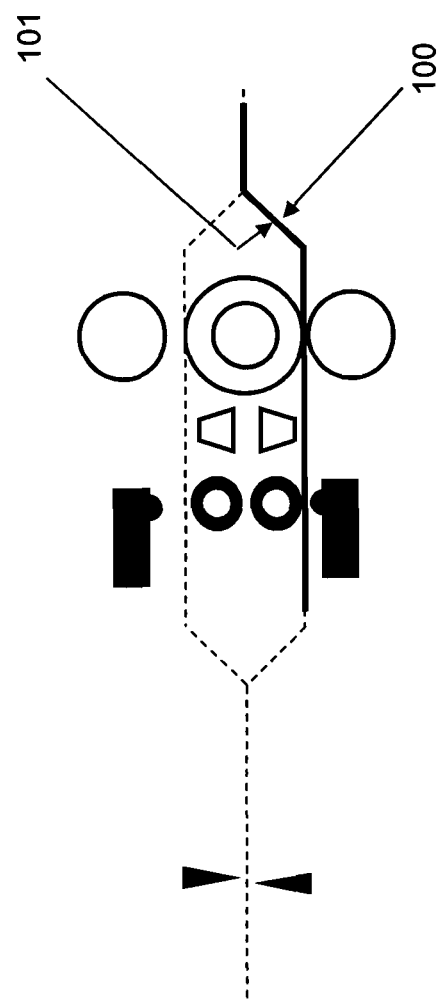
FIG. 6 illustrates a document positioned in a thermal printer apparatus.
Figure 7:
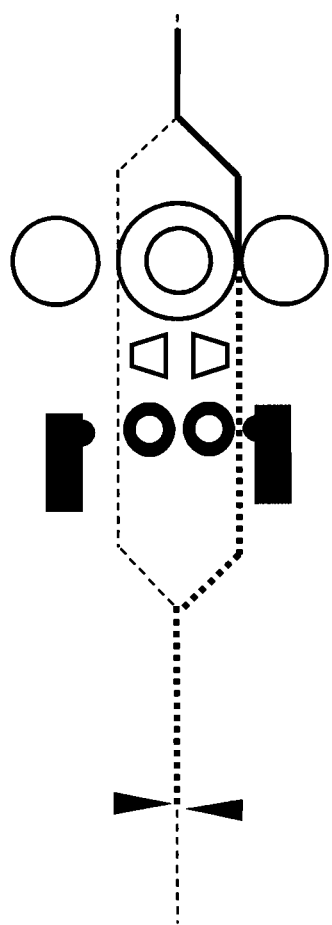
FIG. 7 illustrates a document positioned in a thermal printer apparatus.
Figure 8:
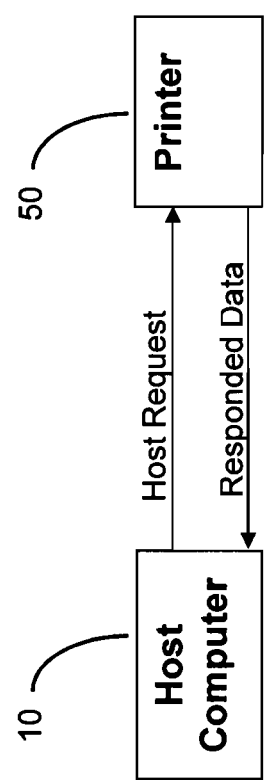
FIG. 8 illustrates host-printer communication.

FIG. 1 illustrates an example printing system for practicing embodiments of the present invention. In this example embodiment, the printing system includes a host computer 10 which typically comprises keyboard 46 and mouse 44 as input devices communicatively connected to the computer's desktop interface device 28. The interfaces illustrated in FIG. 1 can include USB interfaces and other wired connections, as well as wireless connections via Wi-Fi or cellular. The term "host computer" or "host PC" is intended to include any data processing device, such as a server, desktop computer, PC, a laptop computer, a mainframe computer, a router, a personal digital assistant, a Blackberry, or any other device for computing, classifying, processing, transmitting, receiving, retrieving, switching, storing, displaying, measuring, detecting, recording, or reproducing any form of information, intelligence or data for any purpose whether implemented with electrical, magnetic, optical, or biological components, and otherwise. The phrase "communicatively connected" is intended to include any type of connection or transmission media, whether wired, wireless, or both, between devices, computers, or programs in which data may be communicated.

Output from host computer 10 is typically presented on a video display 52, which may be communicatively connected to the computer 10 via the display interface device 24. Internally, the computer 10 contains components such as CPU 14 and computer-accessible memories, such as read-only memory 16, random access memory 22, and a hard disk drive 20, which may retain some or all of the image data, page data, print documents, character data, and programming referred to herein. The phrase "computer-accessible memory" is intended to include any computer-accessible data storage device, whether volatile or nonvolatile, electronic, magnetic, optical, or otherwise, including but not limited to, floppy disks, hard disks, Compact Discs, DVDs, flash memories, such as USB compliant flash drives, for example, ROMs, and RAMs. The CPU 14 communicates with other devices over a data bus 12. The CPU 14 executes software stored on, for example, hard disk drive 20. In addition to fixed media such as a hard disk drive 20, the host computer 10 may also contain computer-accessible memory drives for reading and writing data, such as page print image data, from and to removable computer-accessible memories. This may include a CD-RW drive 30 for reading and writing various CD media 42 as well as a DVD drive 32 for reading and writing to various DVD media 40. The printer 50, such as described herein is a dye diffusion thermal transfer printer communicatively connected to a printer interface device 26 for communicating with processor 14 over data bus 12. The connection between the thermal printer 50 and the printer interface device 26 serves as a two way communication channel between the printer and the host computer. The printer 50 includes a supply of receiver media, typically in rolled form, and preferably includes an exit tray 28 for holding a plurality of printed receiver media sheets. Printer 50 typically includes a buffer memory for storing print information, for example such as Postscript data, for formatting documents to be printed. In a preferred embodiment of the present invention, printer 50 incorporates memory sufficient to store print data for a plurality of pages of a print job and a processor sufficient to selectively sequence pages of the print job for printing and for controlling communications and all components of the printer as illustrated herein. Additional information can be stored for each type and size of media, including a finish of media, for example. The printer preferably includes selectable printing options such as duplex and simplex printing. These selectable options can be controlled by user input to the computer system via the mouse 44 or keyboard 46 illustrated, and as confirmed by a convenient graphical user interface on video display 52. A digital scanner 6 or other image capture device such as a digitizing tablet or a camera can be communicatively connected to the computer 10 through, for example, the USB interface device 34 to transfer image from the scanner 6 to the computer's hard disk drive or other connected memory devices. Finally, the computer 10 can be communicatively connected to an external network 60 via a network connection device 18, thus allowing the computer to access digital objects and media assets from other computers, devices, or data-storage systems communicatively connected to the network.

A collection of print documents, and/or media assets can reside exclusively on the hard disk drive 20, compact disc 42, DVD 40, or on remote data storage devices, such as a networked hard drive accessible via the network 60, or on other local memory devices such as a thumb drive. A collection of digital objects and documents can also be distributed across any or all of these storage locations. A collection of digital objects and documents may be represented by a database that uniquely identifies individual digital objects (e.g., such as a print job) and their corresponding location(s). It will be understood that these digital objects can be media objects or non-media objects. Media objects can be digital images, such as those captured by scanner 6. Media objects could also include files produced by graphic, text or animation software.

For creating a two-sided or duplex photo book, the preferred method of printing outlined above is critical for reduction of image artifacts during photo book creation on dye diffusion thermal transfer printers, and also results in improved through-put. However, in implementing this preferred method of printing, the page printing sequence must be modified in order to produce a sequentially paged photo book that is assembled from the printed sheets output by the printer into the exit tray.

Figure 9:
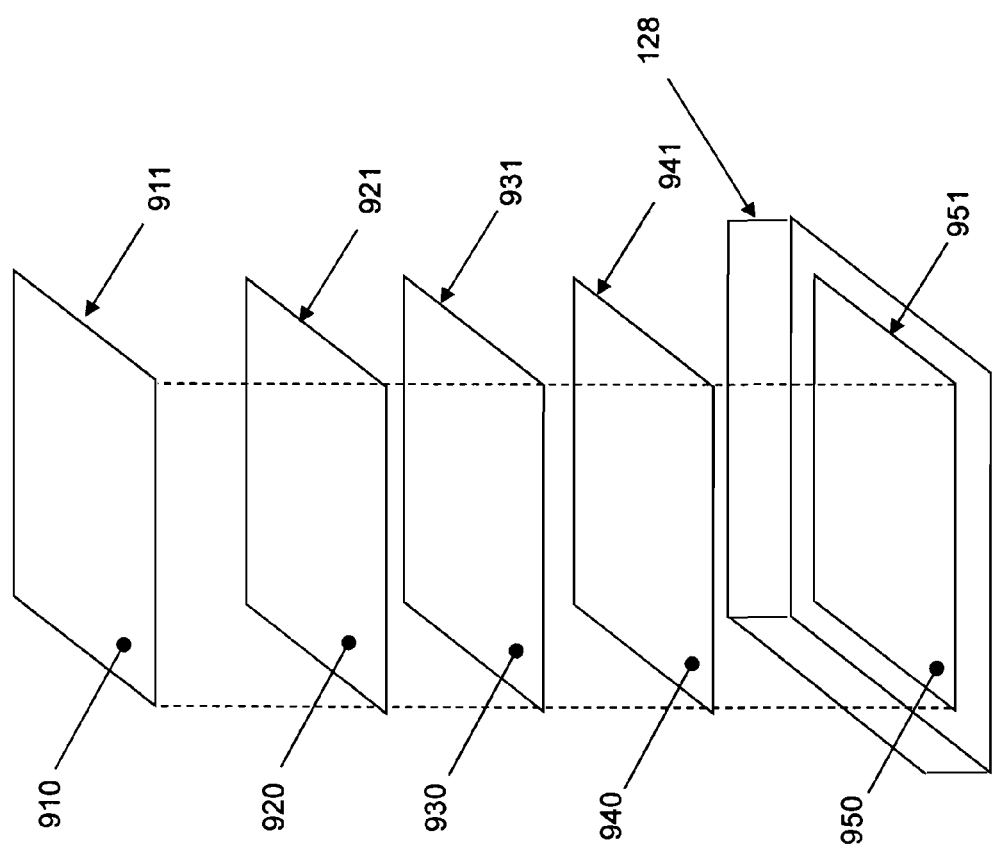
FIG. 9 illustrates page order as output by a two-sided printer.

The typical print job printing sequences discussed above are appropriate to support a non-preferred method of always printing Side A on TPH1 first, and then Side B on TPH 2 second, for every print job. If either of these sequences is used for the preferred method of printing using two print heads, where each next two-sided print is printed first on the same thermal print head and paper side as was printed last on the previous print, the photo book page order will be incorrect. A preferred method for printing requires the following printing order: new print sheet, Page 10 951 (TPH1), Page 9 950 (TPH2); new print sheet, Page 7 940 (TPH2), Page 8 941 (TPH1); new print sheet, page 6 931 (TPH1), Page 5 930 (TPH2); new print sheet, Page 3 920 (TPH2), Page 4 921 (TPH1); new print sheet, Page 2 911 (TPH1), Page 1 910 (TPH2), which results in the same sheet stack arrangement in the exit tray as shown in FIG. 9. This page order results in the last printed sheet that is ejected into the print catcher tray being the first sheet of the photo book, and so the face-up page order of the finished print stack is correct. It should be noted that TPH2 prints all the upward facing pages of the print stack in this sequence and so prints the odd-numbered pages.

An alternate preferred print job printing sequence would be: Page 1 (TPH1), Page 2 (TPH2), Page 4 (TPH2), Page 3 (TPH1), Page 5 (TPH1), Page 6 (TPH2), Page 8 (TPH2), Page 7 (TPH1), Page 9 (TPH1), Page 10 (TPH2), which would result in the photo book being face-down in the print catcher tray stack, but would still be in proper page order. In this case, TPH1 prints the odd-numbered pages.

Sequencing becomes more complicated when a print job contains an odd number of duplex sheets for printing, as in these examples discussed thus far, because the next print job's printing sequence must be changed to utilize a preferred method of an embodiment of the present invention. In the example shown in FIG. 9, the last side printed was Page 1 910, Side B, printed on TPH2, for a face-up print stack. So in order to continue in the preferred method for the next print job, the next page to be printed (which is the first page of the next print job) should be printed on Side B using TPH2 again. Note that this is different from the first page printed of the previous print job which used TPH1 for Side A. The print job printing sequence for this next photo book, for a face-up print stack, is: Page 9 (TPH2), Page 10 (TPH1), Page 8 (TPH1), Page 7 (TPH2), Page 5 (TPH2), Page 6 (TPH1), Page 4 (TPH1), Page 3 (TPH2), Page 1 (TPH2), Page 2 (TPH1). Each print job printing sequence is different, depending on which side and head was used last in the previous print job.

Similarly, if a one-sided (simplex) print job is next in the print queue, the preferred method to minimize the printer generated roller artifact and to maximize throughput is to print all simplex prints on the same thermal print head and paper side as the last page of the previous print job. This may affect which print job printing sequence should be used for the next duplex print job, depending on which side and head was used last. An additional complication can occur when using the preferred printing method to minimize printer generated drive roller artifacts. If a jam, out of media condition, or other problem, occurs during printing, the logic for the page sequencing may become incorrect. This may require the paper to be cleared and printing job to be re-started.

The solution for maintaining proper photo book page order while using the preferred printing method, of starting each duplex print on the same side as was printed last for the previous print, involves the host computer querying the printer to determine which side (Side A on TPH1 or Side B on TPH2) the paper will be staged at the time it is ready to begin the next print. The Host PC can then generate and send the image data in the proper sequence based on which side will be printed first. This solution adequately addresses the complications posed by odd numbers of sheets in a print job, simplex prints, and also the additional complication caused by a jam or other printer error.

Figure 10:
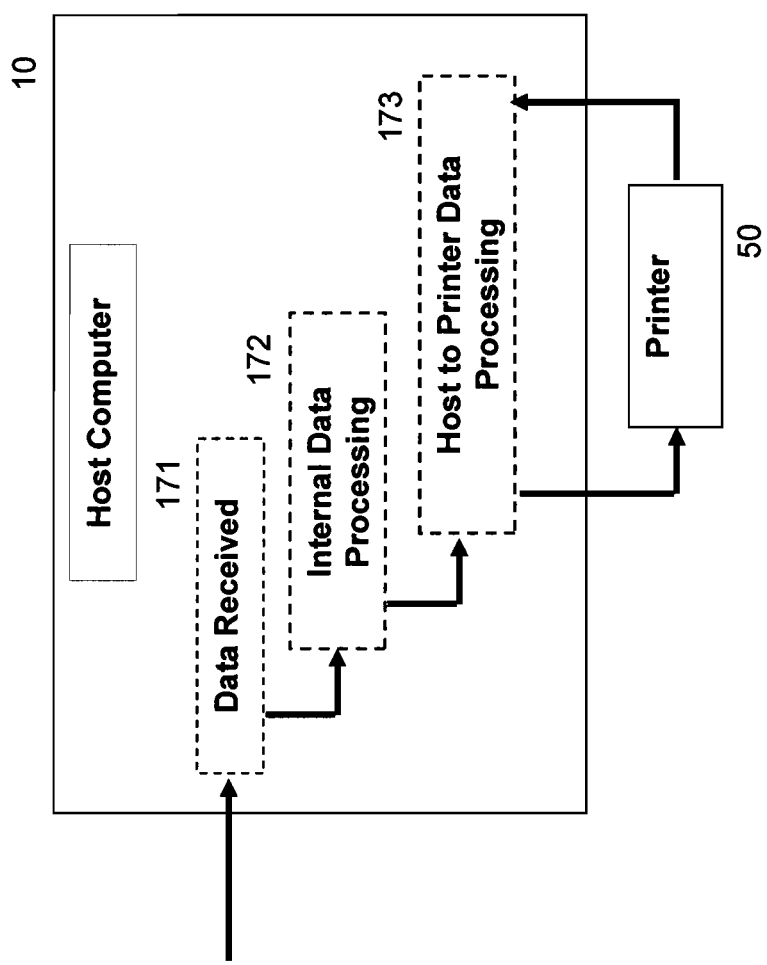
FIG. 10 illustrates a host-printer communication method.

With reference to FIG. 10, communications between the Host Computer and the printer, which forms the printing system illustrated in FIG. 1, will now be described. The Host Computer 10, having internal components as described above receives data from data input sources via, for example, the USB 2.0 communication protocol such as image data coming in from an input source and stores the data at step 171. Internal data processing is performed by the Host Computer at step 172, wherein software takes the received image data and performs certain tasks with the image data such as color correction. The image data moves from the internal image data processing to the printer processing stage at step 173. At step 173 the processed image data is sent from the Host Computer to the printer. This can be done through various means such as USB 2.0 communication protocol. The image data from the Host Computer to the Printer represents pages in a preferred sequence which can be stored on the printer's image buffer. Once the image buffers are emptied, they can accept more image data from the Host Computer. The USB 2.0 communication protocol allows for constant communication between the Host and the Printer.

Figure 11:
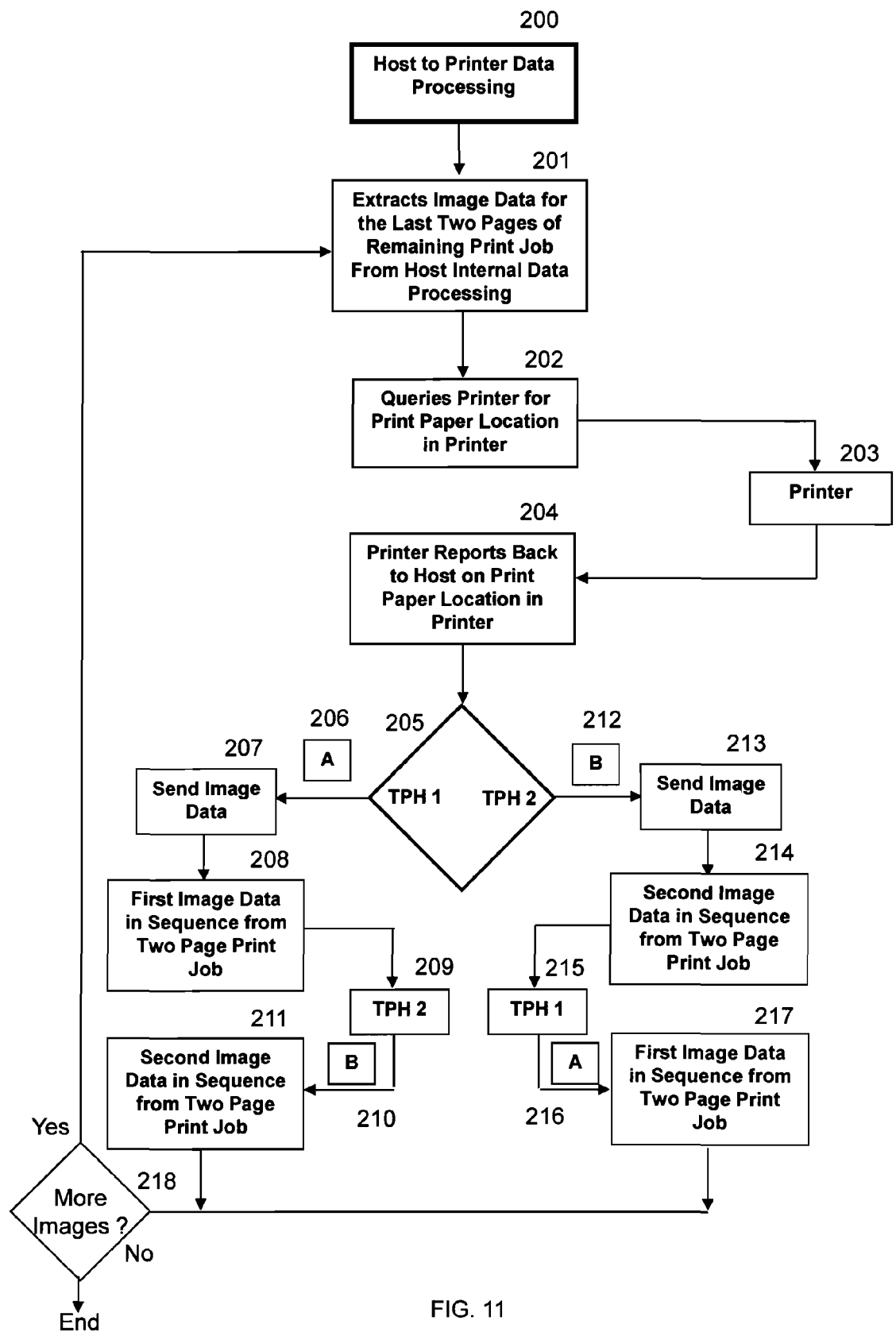
FIG. 11 illustrates a flowchart describing an operational embodiment of the present invention.

FIG. 11 illustrates a flow chart for a printing sequence according to a preferred embodiment of the present invention, wherein the host PC queries the printer and the printer responds to the host PC. Step 200 represents the Host to Printer Data Processing function similar to Step 173 of FIG. 10. Image Data is extracted from the last two pages of remaining print job from the Host Internal Data Processing at step 201. The Host Computer then queries the printer for the print paper location in the printer at step 202. At step 203 the query/communication is transmitted from the Host Computer to the printer, and at step 204 the printer responds to the Host Computer with the print paper location. Step 205 represents a decision point branching to either Thermal Print Head 1 (TPH1) or Thermal Print Head 2 (TPH2). If the printer reported back that the paper position is located on the side of Thermal Print Head 1 using sensors 124 or 130 or both, which also means that the paper is physically closer to TPH1 due to the straight paper path leading to TPH1 and traversed by the paper when the paper is fed forward, then paper surface Side A, Step 206, is the surface that will be printed on. At step 207 the Host Computer then sends the appropriate image data to the printer which, in this instance, is the First Image Data in the sequence from a two page print job at step 208. At step 209 the printer's paper position switches to the side of Thermal Print Head 2. Paper surface Side B will be printed by Thermal Print Head 2 using image data for the Second Image Data in sequence from a two page print job at step 211.

If the printer reports back that the paper position is located on the side of Thermal Print Head 2 at step 205 using sensors 124 or 130 or both, then paper surface Side B of step 212 is the surface that will be printed on. At step 213 the Host Computer sends the appropriate image data to the printer which is the Second Image Data, in sequence from the two page print job as shown at step 214. The printer's paper position is switched to the side of Thermal Print Head 1 at step 215. The paper surface Side A 216 is the surface that will be printed on under Thermal Print Head 1. At step 217, the appropriate image data, the First Image Data, is sent from a two page print job. At step 218 another decision point is based on whether more image data is needed to be printed or not. If Yes, the algorithm goes back to the Host Computer to extract two additional pages or the last page of image data at step 201. If No, the print job is completed.

An alternate solution for maintaining proper photo book page order while using the preferred printing method of starting each duplex print on the same side as was printed last for the previous print, is for the host computer to tell the printer which side of the paper each set of image data is intended to be printed on. For example, print or image data is identified as Side A and Side B. Then, the printer can determine which image data to use next based on whichever side it is about to print (Side A on TPH1 or Side B on TPH2).

Figure 12:
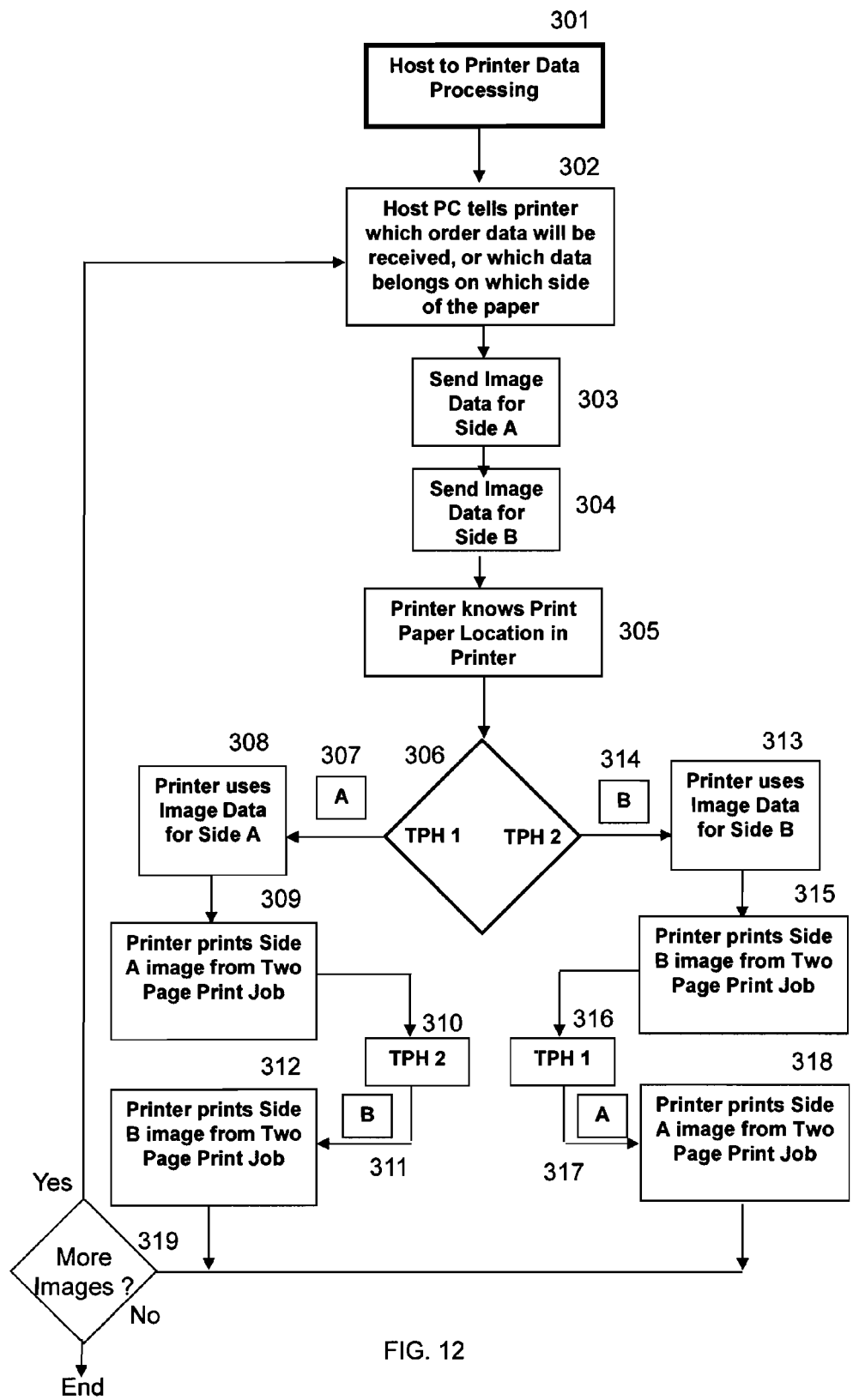
FIG. 12 illustrates a flowchart describing an alternative operational embodiment of the present invention.

With reference to FIG. 12 which illustrates this alternate method, Step 301 represents the Host to Printer Data Processing function similar to Step 173 in FIG. 10. At step 302 the Host Computer sends to the printer the order of the image data that will be received, or which image data will be printed on which side of the paper. At step 303 the Host Computer sends the image data for Side A of the paper to the printer. At step 304 the Host Computer sends the image data for Side B of the paper to the printer. It will be appreciated that the two steps just described can be performed in a reverse sequence. At step 305 the printer detects and identifies the location of the paper in the printer using sensors 124 or 130 or both. Step 306 is a decision point for using either Thermal Print Head 1 or Thermal Print Head 2 depending on where in the printer the paper has been located. If the printer determines that the paper position is located on the side of Thermal Print Head 1 then paper surface A is determined as the surface that will be printed on at step 307. At step 308 the printer accesses the image data for side A. At step 309 the appropriate image data, side A, is printed from a two page print job. At step 310 the printer switches paper position to the side of Thermal Print Head 2. At 311 the paper surface B is the surface that will be printed under Thermal Print Head 2. At step 312 the appropriate image data, side B, is printed in sequence from a two page print job. If the printer determines that the paper position is located on the side of Thermal Print Head 2 at step 306, then paper surface B 314 is the surface that will be printed next. At step 313 the printer accesses the corresponding image. At step 315 the appropriate image data is printed in sequence from a two page print job. At step 316 the printer's paper position switches to the side of Thermal Print Head 1. 317 represents the paper surface A which is the surface that will be printed under Thermal Print Head 1. At step 318 the appropriate image data is printed. Step 319 represents a decision point based on whether more image data is needed to be printed or not. If Yes, the algorithm logic goes back to the Host Computer to obtain two additional pages or the last page of image data and side identification at step 302. If No, the print job is completed.

This solution adequately addresses the complications posed by odd numbers of sheets in a Print Job, simplex prints, and also the additional complication caused by a jam or other printer error. The benefit of this solution over the previous solution is that the Host PC can continue to send image data in the natural or reverse sequential order, rather than having to change the sequence depending on printer position.

The invention has been described in detail with particular reference to certain preferred embodiments thereof, but it will be understood that variations and modifications can be effected within the spirit and scope of the invention.

PARTS LIST

6 Scanner
10 Host
12 Bus
14 CPU
16 Memory
18 Connection Device
20 HDD
22 RAM
24 Interface
26 Interface
28 Interface
30 CD Drive
32 DVD Drive
34 Interface
40 DVD
42 CD
44 Mouse
46 Keyboard
50 Printer
52 Display
60 Network
100 Media
101 Media
110 Media
112 Roller
113 Roller
117 Printhead
121 Paper Path
123 Roller
124 Sensor
125 Guide
126 Cutter
127 Rollers
128 Tray
130 Sensor
131 Roller
133 Paper Path
137 Printhead
141 Roller
171 Step
172 Step
173 Step
200 Step
201 Step
202 Step
203 Step
204 Step
205 Step
206 Step
207 Step
208 Step
209 Step
210 Step
211 Step
212 Step
213 Step
214 Step
215 Step
216 Step
217 Step
218 Step
301 Step
302 Step
303 Step
304 Step
305 Step
306 Step
307 Step
308 Step
309 Step
310 Step
311 Step
312 Step
313 Step
314 Step
315 Step
316 Step
317 Step
318 Step
319 Step
910 Media Side
911 Media Side
920 Media Side
921 Media Side
930 Media Side
931 Media Side
940 Media Side
941 Media Side
950 Media Side
951 Media Side

The invention claimed is:

1. A printing method comprising:
generating print data for a first print job having at least two pages;
determining a position of a rolled receiver media in a thermal printer comprising two thermal printheads wherein a first thermal printhead is located on a first printing path and a second thermal printhead is located on a second printing path; and
sending print data for one page to the thermal printer before sending print data for any other page in response to the position of the receiver media in the thermal printer.

2. The method of claim 1 wherein said step of sending comprises sending the print data for the second page of the first print job before sending the print data for the first page of the first print job.

3. The method of claim 2 wherein said step of determining the position of the receiver media comprises determining at which one of the two thermal printheads in the thermal printer the receiver media is positioned.

4. The method of claim 3 wherein a next print job is a simplex print job and wherein the method further comprises printing all of a plurality of pages in the simplex print job using the one of the two thermal printheads that printed a last page of the first print job.

5. The method of claim 3 wherein one of the thermal printheads is used only for printing even numbered pages in a print job and the step of determining a position of receiver media comprises determining that the position of the receiver media is at the thermal printhead used only for printing even numbered pages.

6. The method of claim 3 wherein a next print job is a duplex print job comprising a plurality of even and odd numbered pages, and wherein the method further comprises printing each of a plurality of pairs of the even numbered pages consecutively during the duplex print job and printing each of a plurality of pairs of the odd numbered pages consecutively during the duplex print job.

7. The method of claim 6, further comprising outputting from the thermal printer the plurality of even and odd numbered duplexed pages in an ordered sequence according to the page numbers.

8. The method of claim 6, further comprising printing the even numbered pages of the duplex print job on one of the two thermal printheads and printing the odd numbered pages of the duplex print job on another one of the two thermal printheads.

9. A printing method comprising:
receiving and storing print data at a printer for a first print job having at least two pages;
determining a position of a rolled receiver media in the printer comprising two thermal printheads wherein a first thermal printhead is located on a first printing path and a second thermal printhead is located on a second printing path; and
printing the print data for one page before printing the print data for any other page in response to the position of the receiver media in the printer.

10. The method of claim 9 wherein the step of printing the print data comprises printing the print data for the second page of the first print job before printing the print data for the first page of the first print job.

11. The method of claim 10 wherein said step of determining the position of the receiver media comprises determining at which one of the two thermal printheads in the printer the rolled receiver media is positioned.

12. The method of claim 11 wherein a next print job is a simplex print job and wherein the method further comprises printing all of a plurality of pages in the simplex print job using the one of the two thermal printheads that printed a last page of the first print job.

13. The method of claim 11 wherein one of the thermal printheads is used by the printer only for printing even numbered pages in a print job and the step of determining a position of a rolled receiver media comprises determining that the position of the receiver media is at the thermal printhead used by the printer only for printing even numbered pages.

14. The method of claim 11 wherein a next print job is a duplex print job comprising a plurality of even and odd numbered pages, and wherein the method further comprises the printer printing each of a plurality of pairs of the even numbered pages consecutively during the duplex print job and printing each of a plurality of pairs of the odd numbered pages consecutively during the duplex print job.

15. The method of claim 14, further comprising outputting the plurality of even and odd numbered duplexed pages in an ordered sequence according to the page numbers.

16. A printing method comprising:
storing a print job comprising a plurality of pages;
determining a position of a rolled receiver media in a thermal printer as being nearer to one of two thermal printheads in the printer, wherein a first thermal printhead is located on a first printing path and a second thermal printhead is located on a second printing path; and
starting a next print job in a duplex format using either of the two thermal printheads depending on which of the two thermal printheads was determined to be nearer the rolled receiver media, including printing a second page of the next print job using the thermal printhead that was determined to be nearer the receiver media before printing a first page of the next print job.

17. The method of claim 16 wherein the step of storing the print job comprises storing the print job in a memory of the printer.

18. The method of claim 17 wherein the next print job comprises a plurality of even and odd numbered pages, and wherein the method further comprises printing each of a plurality of pairs of the even numbered pages consecutively during the duplex print job and printing each of a plurality of pairs of the odd numbered pages consecutively during the duplex print job.

19. The method of claim 18, further comprising outputting the plurality of even and odd numbered pages in an ordered sequence according to the page numbers.

20. The method of claim 16 wherein the step of storing the print job comprises storing the print job in a memory of a host computer connected to the printer, and wherein the step of starting the next print job comprises the host computer sending print data for the second page of the next print job to the printer before sending print data for the first page of the next print job to the printer.

* * * * *